Sept. 23, 1947.  N. B. WALES, JR  2,427,936
CONTROL MECHANISM FOR HELICOPTERS HAVING
CO-AXIAL COUNTER-ROTATING ROTORS
Filed Sept. 18, 1943  4 Sheets-Sheet 1
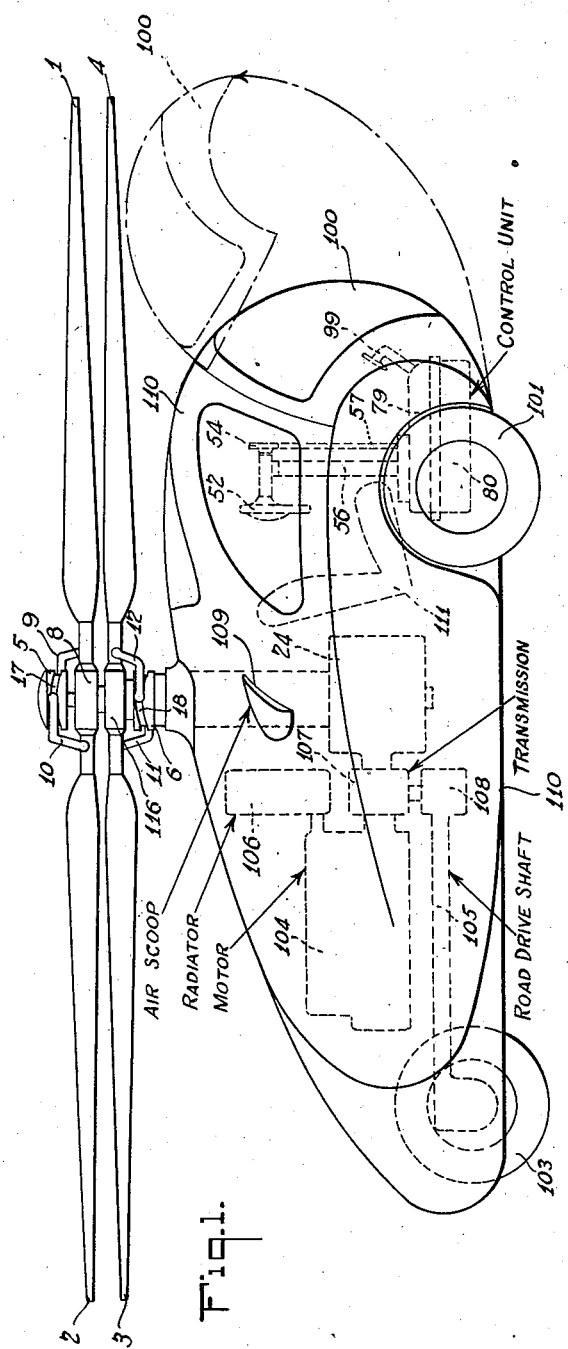
INVENTOR
NATHANIEL B. WALES JR.
BY
Pennie, Davis, Marvin and Edmonds
ATTORNEYS

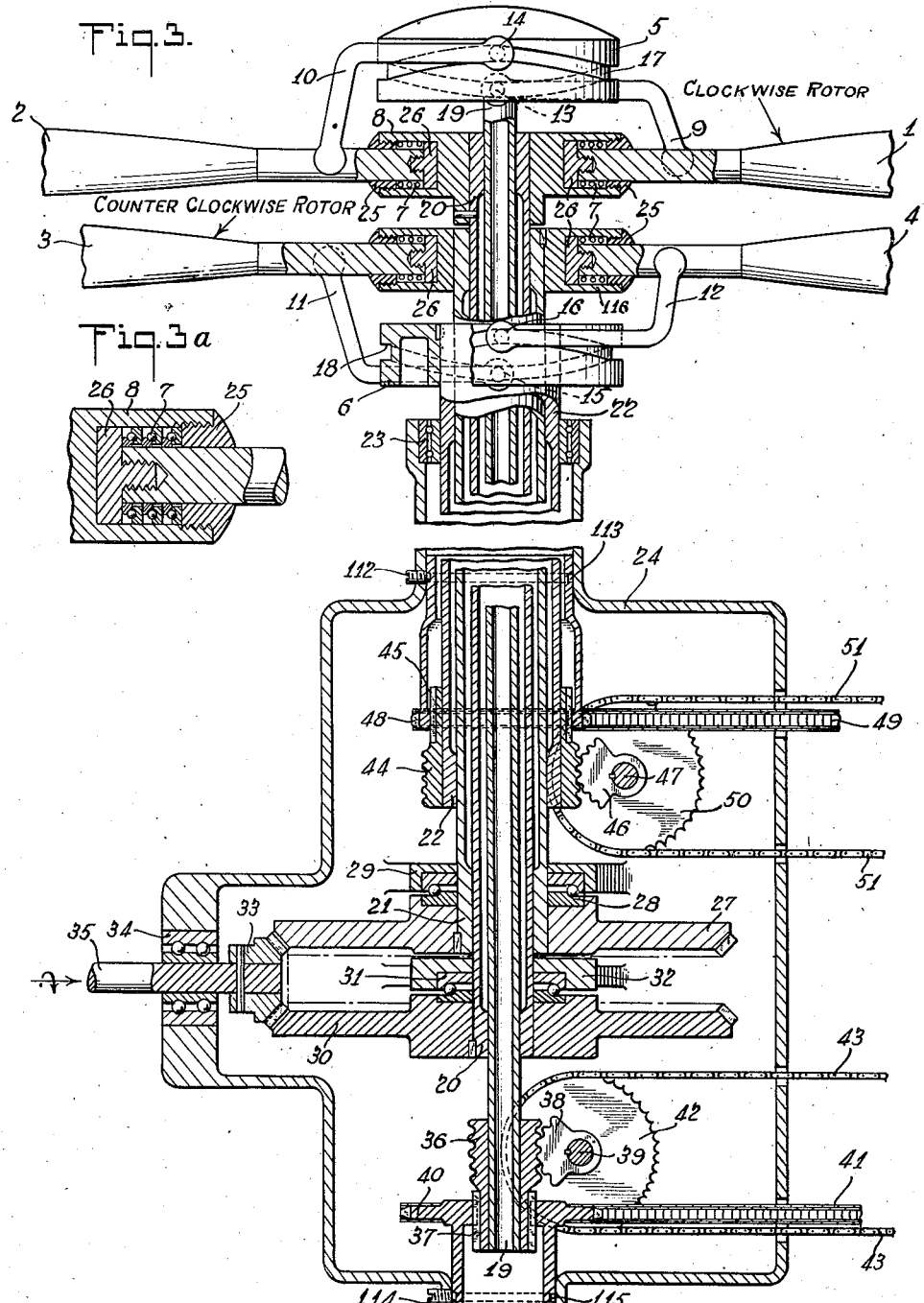

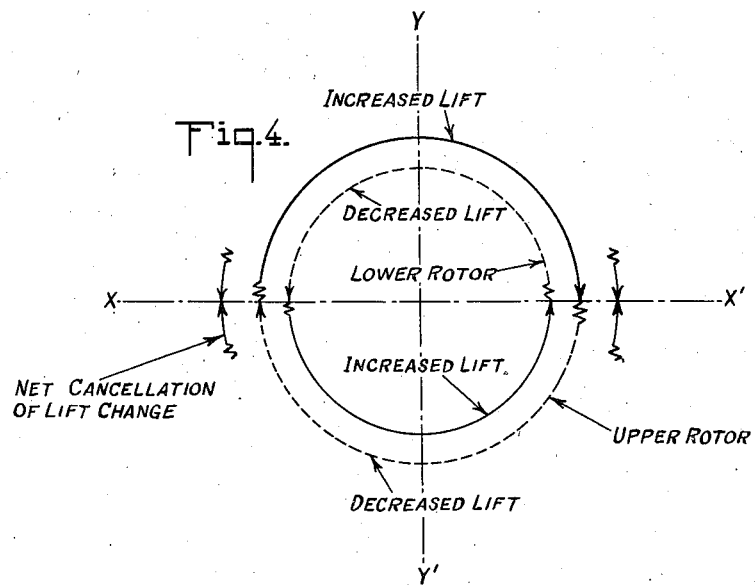
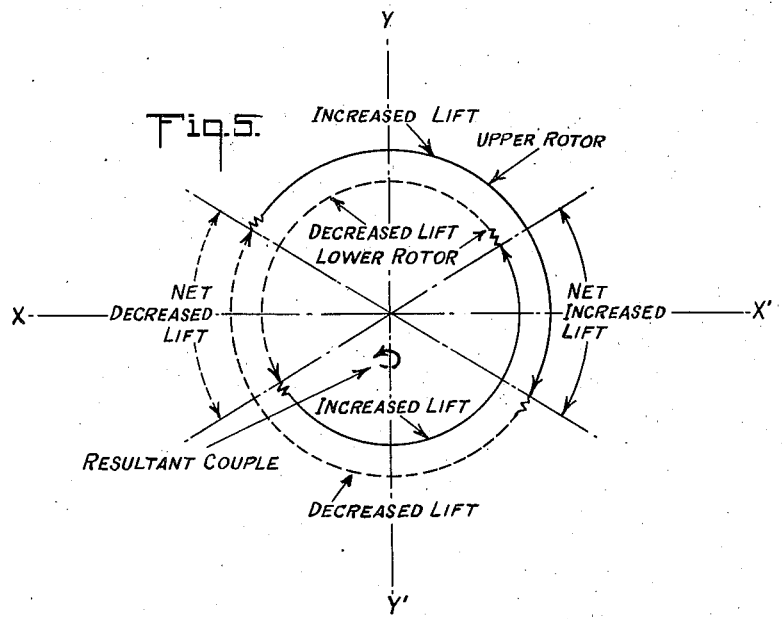

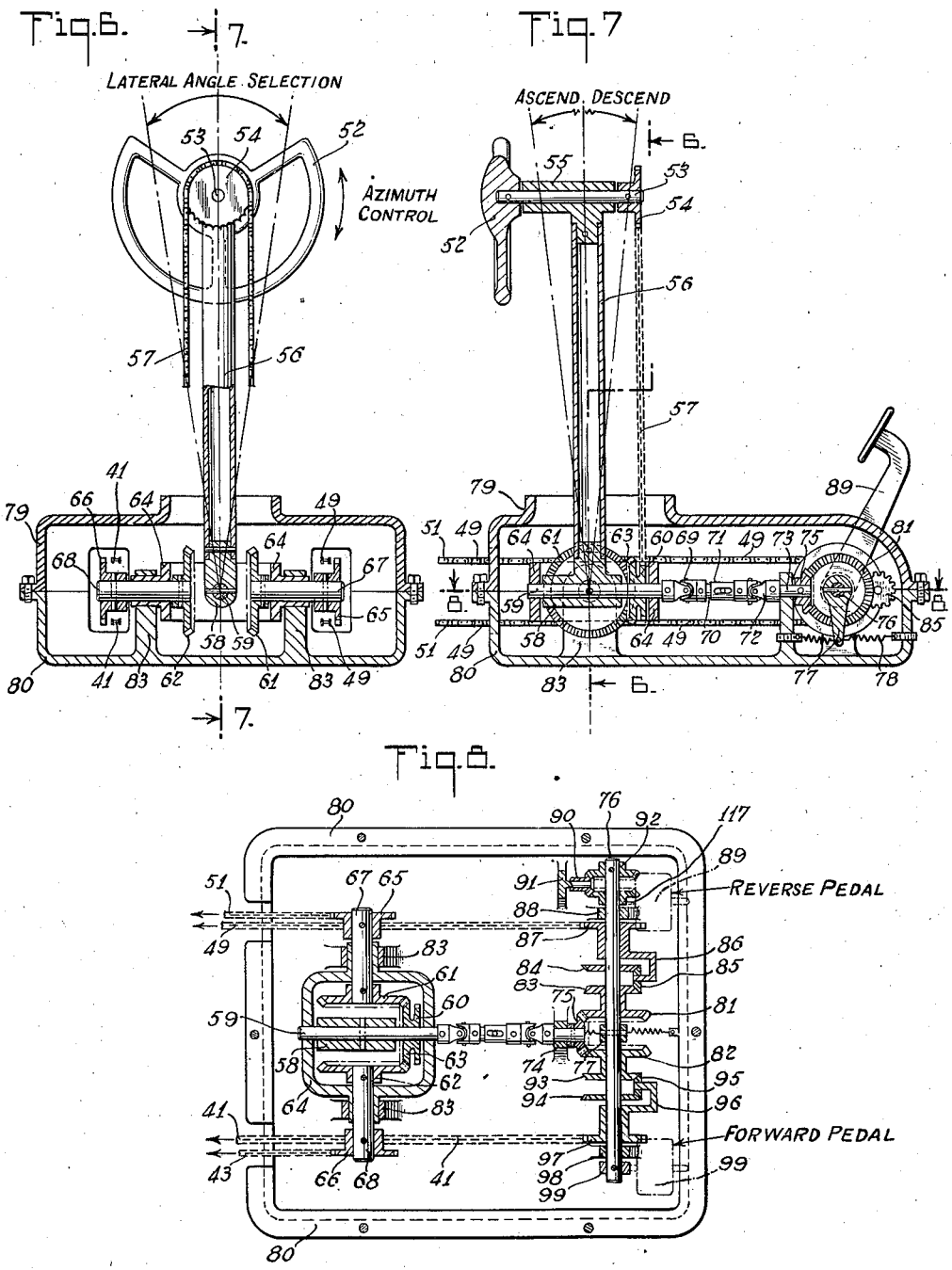

Patented Sept. 23, 1947

2,427,936

UNITED STATES PATENT OFFICE 2,427,936

CONTROL MECHANISM FOR HELICOPTERS HAVING COAXIAL COUNTERROTATING ROTORS

Nathaniel B. Wales, Jr., New York, N. Y.

Application September 18, 1943, Serial No. 502,903

8 Claims. (Cl. 244—17)

1

This invention relates to helicopter aircraft of the coaxial rotor type, and to a control system and method for stabilizing and directing such aircraft, and has for its object the improvement and simplification of the mechanism and controls thereof.

In the design of helicopters, it has been recognized that means must be provided to compensate for the aerodynamic reaction torque of any rotor, or rotating airfoil, and also that means must be provided effectively to incline the lift vector to the lifting rotor or rotors to the vertical in any chosen direction under control of the pilot so as to set up a translational force component of the lift vector in the horizontal plane. Heretofore it has been also recognized that a coaxial construction comprising two lifting rotors counterrotating about a common axis, would be a desirable and compact means for neutralizing the reaction torques effective on the helicopter. However, in the prior art the control means associated with such counter-rotating rotors for inclining their lift vector to the vertical have been of such complexity that serious engineering difficulties have been encountered in executing such a design. In particular, the method of "cyclic pitch control," which has been the most successful of such control systems, has required the use of a swash plate type of cam mechanism having two degrees of angular freedom to allow the pitch of the individual rotor air foils to change cyclically with any chosen amplitude about any chosen index point of their rotation, and in addition having one degree of axial translational freedom to permit alteration of the total effective pitch of the rotor for vertical lift control. This type of mechanism with its three degrees of control freedom has discouraged the use of a coaxial type of construction due to the consequent complexity and weight of duplicating these controls on two concentric rotors. For this reason, designers have been forced to include an auxiliary means for counteracting the rotor reaction torque, such as by means of an additional propeller acting in the horizontal plane at a point remote from the axis of the main rotor.

The present invention embraces a method for combining the instantaneous lifting forces of two coaxial counter-rotating air foils so that full control of the inclination and magnitude of the resultant lift vector is possible while using only two degrees of control freedom for each of the two counter-rotating rotors. This invention comprises first, establishing a sinusoidal or other suitable variation of fixed amplitude of the lift for each of the rotating air foils of the rotors so that each rotor experiences a resultant aerodynamic couple of fixed magnitude about an axis perpendicular to the axis of rotation, and second, phasing the axes of these rotor couples so that their resultant produces the desired magnitude and direction of control couple. Thus, the adjustable control of phase comprises the third degree of control freedom.

The illustrative mechanism shown in the drawings, embodies this method of phased lift cycles by means of two cam mechanisms capable of cyclically imposing a fixed amplitude oscillation of pitch on the blades of each of the two rotors as they revolve in opposite directions. The phase relationship between these two cams will then determine the direction and magnitude of inclination to the vertical to which the entire coaxial system will be subjected. In particular, when the phase of the fixed amplitude tilting couples of the two rotors is adjusted so that they are displaced from one another by 180°, there will be no resultant tilting couple and the helicopter will remain in vertical equilibrium. On the other hand, if the phase of the two cams does not bring the quadrant of maximum lift for one rotor into coincidence with the quadrant of minimum lift for the other rotor, as in the condition for vertical equilibrium, then there will be a resultant tilting couple whose magnitude and direction relative to the airframe will depend on the phase of the two cams relative to this airframe. The phase of these fixed contour cams can be adjusted by rotating the cams via torque tubes concentric with the coaxial rotor axis, thus affording complete lateral control by one degree of freedom per rotor. The total effective lift for each rotor may be controlled by an axial movement of the cam torque tubes, and so the entire control transmission involves only two cam sleeves each having two degrees of freedom. This mechanism is so arranged that if the cam tubes are axially displaced together, the helicopter ascends or descends vertically due to the total pitch change, whereas if the displacement is a relative one, the ship will rotate about the rotor axis.

Although the illustrated mechanism for embodying my control involves the use of pitch change in order to introduce the fixed amplitude lift variation required by this method, it is evident that the same method could employ a cyclic variation in area, shape, velocity or any other characteristic of the rotating air foil which may contribute to its lift, without departing from the scope of the invention. Similarly, although a cam mechanism is depicted as the means for changing the phase of these fixed amplitude lift variations, any other suitable means familiar to those skilled in the art may be used to achieve this function.

The nature of my control system is such that the four degrees of freedom used to control the maneuvers of the helicopter; namely, one degree of translational freedom and one degree of rotational freedom for each of the two control cams, fall into two classes. These two classes are: 1. Common displacement of angle or of translation for the two cams; and, 2. Relative displacement between the angle or between translations of the two cams. Specifically, the four resultant control operations which result from these two classes of displacement for rotation and translation, and the consequent behaviour of the helicopter are as follows:

(a) Common translation of the cams results in control of the ascent or descent.

(b) Relative translation of the cams results in control of the rotation or steering of the helicopter about its vertical axis.

(c) Common rotation of the cams results in selection of the direction in a horizontal plane along which a phase difference between them will produce translational forces on the helicopter.

(d) Relative rotation of the cams from the neutral 180° position results in the production of a couple which will cause the helicopter to move in the direction chosen by "c."

Consequently, it is an integral feature of my invention that an aircraft control system closely analogous to the control operations of a conventional automobile may be adopted in which selection of the direction of motion is made in one operation, as by the steering wheel of an automobile, while the execution of this motion in the direction selected by the wheel is made in an independent operation such as by operation of the accelerator (or clutch) of an automobile.

Thus, in the control system of my invention it is made possible to provide a control column whose motion selects the direction of lateral motion as in operation "c" controlling the common rotation or phasing of the cams, whereas the execution of this selection may be made by a pedal (analogous to an automobile accelerator) which controls the relative rotation of the cams as in operation "d" above. Furthermore, since the sense, or vectorial sign, of the couple produced by operation "d" depends on the sense of relative rotation between the cams, it is possible to provide a second pedal (analogous to the brake of a conventional automobile) which will perform operation "d" in reverse, thus "braking" the motion in the selected direction, and if continued, will produce motion in reverse of the selected direction.

This allocation of control, which functions so that selection and execution of horizontal motion are distinct operations, is a novel contribution to the art of aircraft control which minimizes the skill and training required of the operator, since he may apply to flight the natural coordination reflexes acquired in automotive control.

An additional feature of this invention lies in the relation of the cyclic pitch changes of the rotors to the direction of lateral motion consequent from the phasing of the two pitch control cams. It will be seen that the necessary condition for tilting to produce translational motion of the helicopter is also one in which the blades are feathered for lesser pitch when moving in the direction of the helicopter (that is, into the slipstream) and for greater pitch when moving opposite the motion of the helicopter (with the slipstream). This action tends to minimize the drag and turbulation consequent to excessive slipstream velocities over the air foils, and thereby improves the limiting speed and performance which the helicopter will exhibit.

A better understanding of the invention may be had by referring to the drawings wherein:

Fig. 1 is a side view in elevation of a helicopter aircraft embodying my invention, and showing in broken line the relation of interior components of the system;

Fig. 2 is a plan view of the structure of Figure 1;

Fig. 3 illustrates a vertical section of the rotor hubs, control cam system, and drive mechanism;

Fig. 3a illustrates in detail the structure of the rotor bearing stacks;

Fig. 4 is a schematic phase diagram of the rotor lift relations between the two rotors obtaining for vertical equilibrium;

Fig. 5 is a schematic phase diagram of the rotor lift relations for the condition of translational motion along the horizontal line X'—X;

Fig. 6 is a transverse vertical section through the control unit showing the control column and wheel;

Fig. 7 is a vertical section along line 7—7 of Fig. 6; and

Fig. 8 is a horizontal section along line 8—8 of Fig. 7.

Referring to Figures 1 and 2, the airfoil rotor blades 1 and 2 may be seen to be journalled in hub member 8, thus comprising the upper rotor, which is driven in the clockwise direction as seen from above. Similarly, the blades 3 and 4 are journalled in hub 116 to form the lower rotor, which rotates in the counter-clockwise direction. The cam arms 9 and 10 are integrally secured to rotor blades 1 and 2 respectively, and both arms engage the groove 17 in the relatively stationary cam cylinder 5. Consequently, on rotation of the rotor, the blades 1 and 2 are caused to undergo a cyclic pitch change of fixed amplitude, as determined by the closed cam track 17. In like manner, the lower rotor blades 3 and 4 with integral cam arms 11 and 12 are made to follow the pitch cycle imposed by cam track 18 in cam cylinder 6. The coaxial rotor assembly together with their concentric control cam tubes are journalled in the supporting casing 24 which extends downward within the helicopter body 110 to form the drive and control mechanism housing. Power from motor 104 is delivered through transmission 107 to the rotors by the drive mechanism in casing 24. Airscoops 109 and radiator 106, together with appropriate conduits, form the principal components of the cooling system. The landing and road gear comprise the two steerable front wheels 101 and 102 together with the single rear drive wheel 103. Power transmission means in unit 107 are provided to supply power through auxiliary road transmisison 108 via torque tube 105 to the rear drive wheel 103, thus making the vehicle capable of either road or air navigation.

The transparent nose section 100 is hinged about an axis near the upper joint between it and the body 110, thereby affording direct access to the seat 111 which accommodates both pilot and passengers. On a level below the feet of the pilot, casing 79—80 houses the control transmission system. Control column 56 with the integral steering wheel 52, is journalled within casing 79—80. The control motion of the control column 56 and wheel 52 together with those of pedals 89 and 99 are coordinated in the control transmission unit 79—80 and transmitted by four chain drives via suitable idler guides (not shown) to the cam control mechanism in casing 24.

Figures 3 and 3a show the rotor cam system and drive mechanism in detail. In Figure 3, power from the drive motor and transmission is delivered through shaft 35 journalled in bearing 34 secured to casing 24, to bevel gear 33 where it is distributed between the reduction bevels 27 and 30. This arrangement causes gears 27 and 30 to rotate in opposite directions. Power delivered to gear 27 is transmitted via integral torque tube 21 and hub 116 to the rotor blades 3 and 4, whereas power delivered to gear 30 is transmitted via integral torque tube 20 and hub 8 to the rotor blades 1 and 2. The lift thrust and radial loads imposed on torque tubes 20 and 21 are absorbed by the bearings 31 and 28 respectively which in turn are secured to the frame casing members 32 and 29 respectively. Each rotor blade is journalled into its hub by means of the bearing stacks 7 which are combination radial and thrust bearings as shown in further detail in Figure 3a. The blade is retained against centrifugal displacement by shoulder studs 26 which are secured to the blades and abut against the bearing stacks 7. The bearings 7 are retained in their respective hubs by bushings 25.

Although it is not an essential part of my invention that the cycle of lift variation be sinusoidal, in the preferred embodiment shown in Figure 3 utilizing pitch variation, the cam groove 17 cut into the periphery of cam member 5 has a straight line projection in the plane passing through the axis of cam cylinder 5 and perpendicular to the plane of Figure 3. Thus the motion which it imparts to the spheroidal hardened cam follower 14 which engages this groove is substantially sinusoidal. This motion is transmitted through cam arm 10 to blade 2 so as to impose on it the required cyclic oscillation of pitch. The lever arm through which this cam action operates may be seen clearly in Figure 2. In the position shown, blade 2 is moving away from the observer in Figure 3, and consequently the upward displacement of 10 results in a decreased pitch for blade 2. On the other hand, blade 1 is in a position of increased pitch since its cam arm 9 is engaging the cam groove 17 at a position 180° displaced from arm 10. Similar reasoning would apply if three or more blades were used instead of the two illustrated. Conversely, the cam groove 18 in cam cylinder 6 is geometrically identical to groove 17, but is so positioned that in the position shown the counter-rotating blades 3 and 4 occupy positions of increased and decreased pitch respectively by virtue of the cam arms 11 and 12 with the respective cam followers 15 and 16.

Cam cylinders 5 and 6 are secured to control tubes 19 and 22 respectively. Thus rotation of these tubes together will change the direction for which a given phase relation obtains, whereas relative rotation of these tubes with respect to each other will change the phase relations of the cams for a given direction. The mechanism for controlling these phase relations is shown in the lower casing 24 to which the entire coaxial assembly of torque tubes 19, 20, 21 and 22 is journalled by bearing 23. Bushing 45, which is secured to cam tube 22, is splined to sprocket 48 so that linear movement of chain 49 which engages this sprocket will control the absolute phase of cam 6 relative to the airframe. Similarly, linear motion of chain 41 engaging sprocket 40 splined to bushing 37 secured to tube 19 will control the absolute phase of cam 5 relative to the airframe. The axial displacement of sprockets 40 and 48 is prevented by studs 114 engaging groove 115, and by studs 112 engaging groove 113 respectively.

For control of ascent or descent of the helicopter, and also for steering purposes, it is further necessary to control the total pitch of each rotor. This total pitch may be considered to be the average pitch of a rotor blade through its cycle of pitch variation. The means shown to effect this control comprise the gear segment 46 engaging the cylindrical rack member 44. Since rack member 44 and integral bushing 45 are secured to the cam tube 22, rotation of gear segment 46 by sprocket 50 through shaft 47 by linear movement of chain 51, will cause the entire cam member 6 to rise or fall relative to the plane of the rotor blades 3 and 4. Similarly linear movement of chain 43 will control the increase or decrease of the total pitch of the upper rotor through the elements 42, 39, 38, 36, 19 and 5 respectively. The cylindrical form of racks 44 and 36 allows free rotation of the cam tubes independently of any translation, whereas the splined bushings 45 and 37 allow free translation of the control tubes independently of any rotation.

Referring to Figures 6, 7 and 8 which illustrate the control unit, the mechanism may be seen which translates the motions of the controls into the appropriate linear displacements of the control chains 51, 49, 43, and 41. The control column 56 is secured at the top to the steering wheel bearing member 55, and at the bottom to fitting 58 which in turn is pinned to shaft 59. Shaft 59 is journalled in the gimbal frame 64, thus allowing the control column to be moved from left to right as seen by the pilot, about the longitudinal axis 59. Gimbal frame 64 is itself journalled by supports 83 which are integral with the lower casing 80. This gimbal support allows the control column to be moved fore and aft in rotation about the transverse axis of bearings 83. Thus column 64 is effectively pivoted at or near its base to move in four directions. Steering wheel 52 is secured to shaft 53 to which is pinned sprocket 54, the entire assembly being journalled in the fitting 55. Chain 57 links sprocket 54 with sprocket 60. However, sprocket 60 which is journalled on, but not secured to shaft 59, is integral with bevel gear 63. Gear 63, in turn engages on one side the mating bevel gear 61 which drives sprocket 65 through shaft 67, and on the other side it engages bevel gear 62 which drives sprocket 66 through shaft 68. Shafts 67 and 68 are supported concentrically within the bearing sleeves of gimbal frame 64. Consequently, rotation of wheel 52 will cause sprockets 65 and 66 to rotate in opposite directions, whereas inclination of the control column about the bearings 83 will cause sprockets 65 and 66 to rotate in the same direction.

Movement of the control column to left or right as seen by the pilot produces rotation of shaft 59. This rotation is transmitted through universal joint 69, telescopic coupling 70—71 and second universal joint 72 to the shaft 73 and thence to bevel gear 75. This type of coupling allows the gimbal frame 64 to rotate about its bearings 83 without interfering with the transmission of rotation from shaft 59 to bevel gear 75. The remaining mechanism is designed to combine the control rotation of gear 75 due to lateral movement of the control column, with the control rotation due to actuation of the pedals 89 and 99 in such a way that the one will produce a differential motion of sprockets 87 and 97, whereas the other will produce a common motion of these sprockets.

Shaft 76 is supported on bearing blocks 88 and 98. Pinned to this shaft are pedal 99, spring biasing arm 77, and bevel gear 92. Gear 92 is engaged by reversing idler bevel gear 90 journalled on support 91. Bevel 90 in turn engages bevel gear 117 which is integral with pedal 89 and which is journalled on but not secured to shaft 76. Springs 78 bias arm 77 and shaft 76 to a neutral mid-position. Consequently, depression of pedal 99 produces clockwise rotation of shaft 76 as seen in Figure 7, whereas depression of pedal 89 produces counter-clockwise displacement of this shaft together with bevel gears 84 and 94 which are secured to it. Bevel gear 83 and bevel gear 81 which engages bevel gear 75, form an integral unit floating on shaft 76. Similarly, bevel gear 82 engaging bevel gear 75 on the other side from bevel gear 81, together with bevel gear 93 form an integral unit floating on shaft 76. Thus a given rotation of bevel gear 75 due to lateral inclination of the control column will produce opposite rotational displacements of bevel gears 83 and 93, whereas a given rotation of shaft 76 due to operation of pedals 89 or 99 will produce common rotational displacements of bevel gears 84 and 94. Both bevel gears 83 and 84 engage the differential bevel 85 which is journalled by a pin on arm 86. This arm and pin are integrally connected to sprocket 87 and together float on shaft 76 or axis. In like manner, bevel gears 93 and 94 engage the differential bevel gear 95 carried on arm and sprocket assembly 96 and 97 freely journalled on shaft 76. These two differential transmissions each have the property of independently and algebraically combining the angular displacements of their coaxial drive pinions. Thus a given rotation of control bevel 75 will rotate the sprockets 87 and 97 in opposite directions, whereas depression of either pedal 89 or 99 will rotate these sprockets 87 and 97 in a common direction.

However, in order to execute the control operations listed above as operation "c" and operation "d," it is required that inclination of the control column produce a common displacement of chains 41 and 49 and that operation of the pedals 89 and 99 produce a relative displacement between these chains. Consequently, in order to reconcile these reversed conditions obtaining between the convenience of the mechanical arrangement, shown in Figure 8, and the control requirements, it is simply necessary to reverse the chain 41 by a crossover in the idler arrangement (not shown) which guides the chains between the transmission case 24 and the control case 80. Due to this reversal, it follows that inclination of the control column will produce a common rotation of the phase of cams 5 and 6, whose direction of rotation will depend on the direction of inclination. This common rotation thus selects the lateral direction in which a differential phase shift will set up a translational couple in the helicopter. Subsequent to this selection, depression of pedal 99 will cause a differential motion of cams 5 and 6 thus opening up segments of net increased and decreased lift for the two rotors. Conversely, depression of pedal 89 will set up a translational couple in the opposite direction of torque from that set up by pedal 99.

The operation of my method of phased lift cycles may be followed with reference to Figures 4 and 5. In Figure 4, the outer circle represents the cycle of lift effective during one cycle of rotation for the clockwise rotor while the inner circle represents the corresponding cycle of lift for the counter-clockwise rotor. The 180° segments of these two circles shown as solid arrows represent that part of the cycle during which the fixed lift changing device, in this case the pitch cam 5, causes any rotor blade traversing this segment to increase its lift above the average pitch, whereas the remaining 180° segments shown as broken line arrows represent that part of the cycle during which the blades are caused to decrease their lift below the average lift throughout the cycle. The point of the cycle at which the lift is increasing through the value of average lift may be considered to be the index point of reference for that rotor. In the position shown the indices for both rotors are coincident and are on the line X—X'. Under these circumstances it may be seen that the region of increased lift for each rotor coincides with the region of decreased lift for the other rotor. For this reason a net cancellation of lift variation takes place and the resultant lift vector is equal to the sum of the average lift vectors for each rotor and lies in the vertical line, thereby giving rise to vertical equilibrium for the helicopter.

On the other hand, the corresponding diagram for the condition in which the index points for the two cycles are not coincident is shown in Figure 5. In this case it is evident that there will be a segment in which the regions of increased lift will overlap in coincidence, and that there will be an equal and opposite segment in which the regions of decreased lift will coincide. The consequence of this condition will be experienced as one region of net decreased lift and an opposite region of net increased lift. These unbalanced aerodynamic reaction forces will produce a couple about the axis Y—Y', thereby tilting the combined average lift vector from the vertical along the direction X'—X which bisects the segments of coincidence. This inclination of the total lift vector will produce a component of the lift vector lying in the horizontal plane, thereby moving the helicopter in the direction X'—X. Evidently, the common rotation of the index points of the two cycles relative to the airframe will change the lateral direction in which the helicopter is propelled. If the axis X'—X lies athwart the helicopter, the ship will move sidewise, whereas if it lies along the fore and aft line, the ship will move forward or reverse depending on the sense of the axis X'—X relative to the airframe. At any intermediate angle of orientation for the line X'—X the ship will execute a "crabbing" motion.

In the control of the helicopter's rotation about a vertical axis, it may be seen that no rotation will obtain if the aerodynamic reaction torques for the two counter-rotating rotors are equal and opposite. This situation will occur when the average pitch of the two rotors is equal. However, if the average pitch of the two rotors is changed relative to each other by the relative translation of cams 5 and 6 by sprockets 50 and 42, then their reaction torques will not cancel, and the difference between their torques will be applied to rotate the ship about the rotor axis. This operation is effected by turning the steering wheel 52 in the desired direction of rotation.

The operation of the helicopter is recapitulated in the chart below which relates the cam functions as transmitted by the chains 51, 49, 41 and 43 from the control column 56 and pedals 89, 99 to the casing 24, to the consequent maneuver of the ship:

| Control Movement | Resultant Maneuver | Cam Function |
|---|---|---|
| Wheel turned clockwise. | Ship rotates clockwise. | Relative total pitch change. |
| Wheel turned counterclockwise | Ship rotates counterclockwise. | Relative total pitch change. |
| Column pulled back. | Ship ascends. | Common total pitch increase. |
| Column pushed forward. | Ship descends. | Common total pitch decrease. |
| Column inclined to left. | Angle of motion to left selected. | Common cam phasing. |
| Column inclined to right. | Angle of motion to right selected. | Common cam phasing. |
| Right pedal depressed. | Ship moves forward in selected direction. | Relative cam phasing. |
| Left pedal depressed. | Ship moves in reverse of selected motion. | Relative cam phasing. |

It is to be noted that in the manual operation which inclines the control column 56 to the left or right for selection of the angle of lateral motion it is a natural tendency of the operator to maintain his grip on the steering wheel 52, which controls azimuthal rotation, in such a way that a given radius of the wheel remains parallel to its previous direction. Consequently the selection of the angle of lateral motion is made without introducing the change of azimuthal direction which would follow if the control column were laterally inclined without the relative rotation between bearing 55 and shaft 53 consequent to the operator's natural parallel control motion noted above.

From a safety standpoint it is also to be noted that in the event of motor failure the ship may descend under full control of the operator, by suitable manipulation of the controls, since the method of phased lift cycles is equally applicable to the control of lateral stability whether the rotors are receiving rotational energy from the drive motor or from aerodynamic forces consequent to the loss of potential energy of the ship in descent.

To descend under these circumstances, the operator gives the ship a forward translational motion by operation of pedal 99 at the moment of motor failure and while the rotors still retain their inertial kinetic energy. This forward motion will sustain the rotation of the rotor in a manner analogous to the operation of an Autogiro due to the fact that the blades of the rotors are cyclically feathered, in the preferred embodiment of my invention, so as to present a lesser pitch when moving in the direction of translation and a greater pitch when moving opposite this direction. The resultant aerodynamic couple maintains the rotation of the blades at the expense of the potential energy of the ship in descent. Consequently the ship will execute a "glide angle" whose attitude and direction is under full control of the operator.

What is claimed is:

1. In helicopter aircraft having coaxial contra-rotating rotors each including a plurality of airfoils, means for controlling the lateral stability of said aircraft, comprising in combination, means including cams and cam followers linked to said airfoils for generating a cyclic variation of fixed amplitude for the lift of each of said airfoils such that each of said rotors receives a resultant aerodynamic couple of fixed magnitude about an axis perpendicular to the axis of rotation, said cams being of fixed amplitude and movable in two degrees of freedom only, viz., longitudinally to the axis of rotation of said rotors and rotationally in a plane perpendicular to said axis of rotation and means for rotating said cams with respect to each other, whereby to adjust the phasing of the axes of said resultant rotor couples so that their combined resultant produces the desired magnitude and direction of control couple.

2. In helicopter aircraft having coaxial contra-rotating rotors each including a plurality of airfoils, means for controlling the lateral stability of said aircraft, comprising in combination a similar fixed contour cam for each rotor mechanically linked to the airfoils in that rotor to control the cyclic pitching of said airfoils such that each of said rotors receives a resultant aerodynamic couple of fixed magnitude about an axis perpendicular to the axis of rotation, and means for adjusting the relative phase of said cams in a plane perpendicular to said axis of rotation so that the combination of said resultant rotor couples produces a control couple of such magnitude and direction as to establish the components of velocity and direction of translational motion in the horizontal plane of said aircraft.

3. In helicopter aircraft the combination comprising two coaxial lifting rotor airfoils positioned in different planes, motive means for rotating said airfoils in opposite directions about an axis of rotation, means including an independent fixed contour cam associated with each rotor causing said airfoils to undergo fixed amplitude cycles of pitch variations, first and second control means operable independently of each other, said first control means being operable to move said cams in a first degree of rotational movement and constructed and arranged to rotate said cams selectively in the same and opposite directions to control the phase of said cycles of pitch variation so as to set up a resultant aerodynamic control couple about a horizontal axis tending to tilt said aircraft, and said second control means being operable exclusively to move said cams in a second degree of translational movement with respect to said axis to control the average pitch of the airfoils of each of said rotors so as to set up a vertical translational force tending to produce ascent or descent of said aircraft.

4. In helicopter aircraft having similar coaxial contra-rotating rotors each including a plurality of similar airfoils, a cam for each rotor, said cams being similar and mounted concentric with each other and with said rotors, a cam follower for each airfoil, means linking each airfoil with its corresponding cam follower whereby the effective lift of said airfoil changes with the position of the follower on said cam, first uni-control means operative selectively to impart to said cams either common or relative translational motion or both, and second uni-control means operative selectively to impart to said cams either common or relative rotational motion, or both, whereby the flight of the helicopter may be controlled in four degrees of freedom with two control means.

5. In a mechanism for the control of helicopter aircraft having an airframe, the combination comprising, a first control shaft, a first cam having a linear cam track of fixed inclination relative to the axis of said first control shaft, said cam being mounted on said shaft so as to be movable thereby longitudinally and rotationally with respect to said axis, a first power shaft concentric with said first control shaft, a first rotor coupled to said power shaft and having a plurality of airfoils, each airfoil being rotatable on its own longitudinal axis, cam follower means individual to each airfoil and mechanically coupled thereto to rotate its airfoil in accordance with its position in said cam track, a second control shaft concentric with said first named shafts, a second cam having a linear cam track of fixed inclination relative to said axis, said second cam being mounted on said control shaft so as to be movable thereby longitudinally and rotationally with respect to said axis, a second power shaft concentric with said other shafts, a second rotor coupled to said second rotor shaft so as to rotate in the opposite direction to said first rotor, said second rotor having a plurality of airfoils each of which is rotatable on its own longitudinal axis, cam follower means individual to each of said last mentioned airfoils and mechanically coupled thereto to rotate its airfoil in accordance with its position in said second cam track, and means for selectively moving each of said cams longitudinally and rotationally from a common position in said aircraft.

6. In a mechanism for the control of helicopter aircraft having an airframe, the combination comprising, a first control shaft, a first cam having a linear cam track of fixed inclination relative to the axis of said first control shaft, said cam being mounted on said shaft so as to be movable thereby longitudinally and rotationally with respect to said axis, a first power shaft concentric with said first control shaft, a first rotor coupled to said power shaft and having a plurality of airfoils, each airfoil being rotatable on its own longitudinal axis, cam follower means individual to each airfoil and mechanically coupled thereto to rotate its airfoil in accordance with its position in said cam track, a second control shaft concentric with said first named shafts, a second cam having a linear cam track of fixed inclination relative to said axis and similar to said first cam track, said second cam being mounted on said second control shaft so as to be movable thereby longitudinally and rotationally with respect to said axis, a second power shaft concentric with said other shafts, a second rotor coupled to said second rotor shaft so as to rotate in the opposite direction to said first rotor, said second rotor having a plurality of airfoils each of which is rotatable on its own longitudinal axis, cam follower means individual to each of said last mentioned airfoils and mechanically coupled thereto to rotate its airfoil in accordance with its position in said second cam track, means for rotating said cams in either direction around said axis, and means for moving said cams longitudinally of said axis and in respect to said airframe.

7. In a flight control mechanism for helicopter aircraft having an airframe, a pair of contra-rotating rotors each including a plurality of airfoils, the combination which includes, two concentric control tubes each capable of rotation and translational movement, a fixed contour cam mechanically coupled to each tube so as to be rotated and translated thereby, a cam follower and link connecting each airfoil with its respective cam to vary the pitch of said airfoil in accordance with the position of its follower on said cam, a control column effectively pivoted to said airframe, a steering member journalled to rotate on said column, means linking said column and said control tubes responsive to the longitudinal inclination of said column about its effective pivot to effect common translation of said tubes to change the average pitch of both said airfoils thereby to control the vertical motion of said aircraft, means linking said steering member to said control tubes responsive to the rotation of said steering member to effect relative translation of said tubes to change the relative pitch of said airfoils thereby to control the rotation of said aircraft about a vertical axis, means linking said column and said control tubes responsive to the lateral inclination of said column to effect common rotation of said tubes to change the common phase of cyclic pitch of said airfoils thereby to control the selection of the direction of horizontal motion with respect to the axis of said aircraft, pedal means, and means linking said pedal means and said control tubes responsive to movement of said pedal means to effect relative rotation of said tubes to change the relative phase of cyclic pitch of said airfoils thereby to control the velocity of forward and backward motion of said aircraft in the direction selected by said means responsive to the inclination of said column.

8. In a flight control mechanism for helicopter aircraft having an airframe, a pair of contra-rotating rotors each including a plurality of airfoils, the combination which includes, two concentric control tubes each capable of rotation and translational movement, a fixed contour cam mechanically coupled to each tube so as to be rotated and translated thereby, a cam follower and link connecting each airfoil with its respective cam to vary the pitch of said airfoil in accordance with the position of its follower on said cam, a control column effectively pivoted to said airframe, a steering member journalled to rotate on said column, to control the rotation of said aircraft about a vertical axis, control means linked to said control tubes to effect common translation of said tubes to change the average pitch of both said airfoils thereby to control the vertical motion of said aircraft, means linking said column and said control tubes responsive to the lateral inclination of said column to effect common rotation of said tubes to change the common phase of cyclic pitching of said airfoils thereby to control the selection of the direction of horizontal motion with respect to the axis of said aircraft, pedal means, and means linking said pedal means and said control tubes responsive to movement of said pedal means to effect relative rotation of said tubes to change the relative phase of cyclic pitching of said airfoils thereby to control the velocity of forward and backward motion of said aircraft in the direction selected by said control means.

NATHANIEL B. WALES, Jr.

REFERENCES CITED

The following references are of record in the file of this patent:

UNITED STATES PATENTS

| Number | Name | Date |
|---|---|---|
| 1,750,382 | Boer | Mar. 11, 1930 |
| 1,921,805 | Bordoni | Aug. 8, 1933 |
| 1,277,452 | Marques | Sept. 3, 1918 |
| 1,831,134 | Paulson | Nov. 10, 1931 |
| 1,345,101 | Perry | June 29, 1920 |
| 1,819,075 | Darr | Aug. 18, 1931 |

FOREIGN PATENTS

| Number | Country | Date |
|---|---|---|
| 125,202 | Germany | Nov. 11, 1901 |